J. B. TRUE.
SHAFT BEARING.
APPLICATION FILED JAN. 23, 1918.

1,303,616.

Patented May 13, 1919.

Inventor:
James B. True
by his attorney
Charles S. Gooding.

UNITED STATES PATENT OFFICE.

JAMES B. TRUE, OF SAUGUS CENTER, MASSACHUSETTS.

SHAFT-BEARING.

1,303,616.    Specification of Letters Patent.    Patented May 13, 1919.

Application filed January 23, 1918. Serial No. 213,275.

*To all whom it may concern:*

Be it known that I, JAMES B. TRUE, a citizen of the United States, residing at Saugus Center, in the county of Essex and State of Massachusetts, have invented new and useful Improvements in Shaft-Bearings, of which the following is a specification.

This invention relates to shaft bearings and is particularly adapted to be used for the rock-shaft of stone crushers which is subjected to heavy strains and thrusts and to excessive wear.

The object of the invention is to provide a bearing which will stand such heavy thrusts and which can be adjusted to take up any wear that may occur and after being adjusted can be firmly set in adjusted position.

The invention consists in the combination and arrangement of parts set forth in the following specification and particularly pointed out in the claims thereof.

Referring to the drawings.

Like numerals refer to like parts throughout the several views of the drawings.

Figure 1:
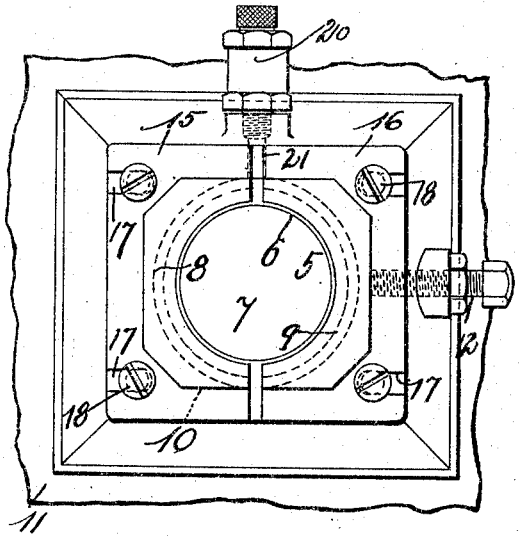
Figure 1 is an end elevation of my improved bearing, a portion of the frame being broken.
Figure 3:
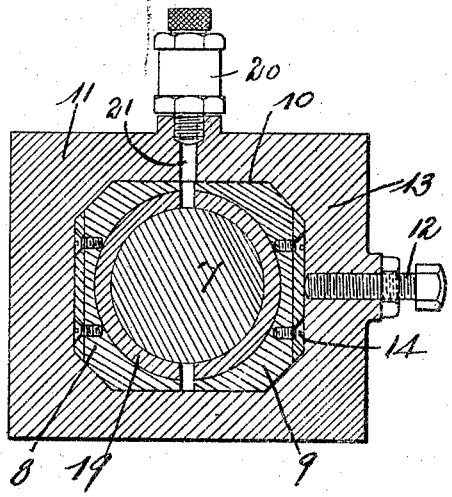
Fig. 3 is a transverse section taken on line 3—3 of Fig. 2.
Figure 2:
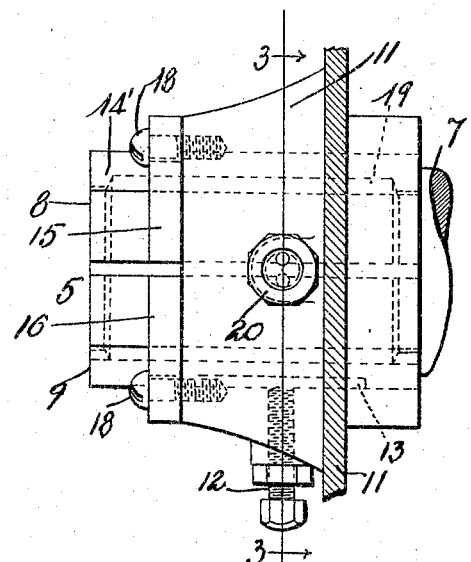
Fig. 2 is a plan view of the same, a portion of the frame being shown in section.

In the drawings, 5 is a sleeve having a cylindrical bore 6 in which the shaft 7 is journaled. The sleeve 5 is split longitudinally thereof to form two parts 8 and 9 and said parts are flattened on their outer sides so that the contour of the outside of the sleeve, as a whole, is octagonal in form. Said sleeve fits in a correspondingly formed octagonal recess 10 formed in the frame 11 and the part 9 is adjusted toward the part 8 by an adjusting screw 12 which has screw-threaded engagement with the frame 11 and bears against a plate 13 of hard metal, preferably steel, which is fastened to the sleeve part 9, by screws 14. It will be observed also that the part 8 has an exactly similar metal plate 13 which is fastened to said part 8 by screws 14.

One end of each of the parts 8 and 9 of the sleeve 5 projects beyond the frame 11, as at 14', and these projecting ends of said parts are provided with flanges 15 and 16, respectively. The flanges 15 and 16 are provided with slots 17 through which clamp-screws 18 project, said clamp-screws having screw-threaded engagement with the frame 11.

The sleeve 5 is preferably provided with a Babbitt metal lining 19. An oil cup 20 is fastened to the frame 11 and supplies oil to the sleeve 5 and the shaft 7 through a passage 21.

The operation of the device is as follows: The shaft 7 is journaled to rock or to rotate, as the case may be, in the bore 6 of the sleeve 5. If the sleeve wears, said wear is taken up by loosening the screws 18 of the part 9 of the sleeve and turning the adjusting screw 12 to move the part 9 toward the part 8. After the sleeve has been thus adjusted it is clamped in the frame to hold it in adjusted position by tightening the screws 18. The screws 18 prevent the part 9 from moving laterally with relation to the shaft and also, as they have engagement with the frame 11, they prevent the sleeve from being moved longitudinally of said shaft.

While the embodiment of my invention illustrated in the drawings discloses a sleeve with eight flatted sides, the number of flatted sides is immaterial and may be greater or less than eight without departing from the spirit of my invention, the object of the flatted sides being primarily to prevent the parts of the sleeve from rotating or rocking with the shaft.

It will be noted that the parts 8 and 9 are interchangeable, that is, if the Babbitt or bearing surface of one of the parts becomes more worn than the other or differently worn, or if for any reason it is desired to interchange the parts and place the part 8 in the place formerly occupied by the part 9 and the part 9 in the position formerly occupied by the part 8, it can be done and the adjusting screw 12 will then bear against the metal plate which is supplied on the part 8. This feature of interchangeability is a very important and practicable feature of my invention.

Having thus described my invention, what I claim and desire by Letters Patent to secure is:

1. A shaft bearing comprising a sleeve with a cylindrical bore, split longitudinally thereof into two parts and having a flat outer side, a frame in which said sleeve fits, means to adjust one part of said sleeve toward the other part thereof, one end of said sleeve projecting beyond said frame and having a flange on the projecting portion of said sleeve adjacent said frame and screws projecting through said flange and having screw-threaded engagement with said frame, whereby said sleeve may be locked to said frame in adjusted position.

2. A shaft bearing comprising a sleeve with a cylindrical bore, split longitudinally thereof into two parts and having a flat outer side, a frame in which said sleeve fits, means to adjust one part of said sleeve toward the other part thereof, one end of each of the parts of said sleeve projecting beyond said frame and having a flange on each of the projecting portions of said sleeve adjacent said frame and screws projecting through said flanges and having screw-threaded engagement with said frame, whereby said sleeve may be locked to said frame in adjusted position.

3. A shaft bearing comprising a sleeve with a cylindrical bore, split longitudinally thereof into two parts and having a flat outer side, a frame in which said sleeve fits, means to adjust one part of said sleeve toward the other part thereof, one end of said sleeve projecting beyond said frame and having a flange on the projecting portion of said sleeve adjacent said frame, said flange being provided with slots extending transversely of said sleeve, and screws projecting through said slots and having screw-threaded engagement with said frame, the heads of said screws engaging said flange whereby said sleeve may be locked to said frame in adjusted position.

4. A shaft bearing comprising a sleeve with a cylindrical bore, split longitudinally thereof into two parts and having a plurality of flat outer sides, a frame in which said sleeve fits, means to adjust one of said parts toward the other and means independent of said adjusting means adapted to engage each of said parts and lock them to said frame in adjusted position.

5. A shaft bearing comprising a sleeve with a cylindrical bore, split longitudinally thereof into two parts, each having a flat outer side, one of said parts being interchangeable with the other, a frame in which said sleeve fits, means to adjust one part of said sleeve toward the other part thereof, one end of each of said parts of said sleeve projecting beyond said frame and having a flange on each of the projecting portions of the parts of said sleeve adjacent said frame and screws projecting through said flanges and having screw-threaded engagement with said frame, whereby said sleeve may be locked to said frame in adjusted position.

In testimony whereof I have hereunto set my hand in presence of two subscribing witnesses.

JAMES B. TRUE.

Witnesses:
CHARLES S. GOODING,
SYDNEY E. TAFT.

Copies of this patent may be obtained for five cents each, by addressing the "Commissioner of Patents, Washington, D. C."